Patented Sept. 4, 1951

2,567,126

UNITED STATES PATENT OFFICE 2,567,126

PROCESS FOR PREPARING 4,4'-NITROPHENYL BENZOIC ACID

Herman E. Schroeder, Wilmington, Del., assignor to E. I. du Pont de Nemours & Company, Wilmington, Del., a corporation of Delaware No Drawing. Application January 25, 1949, Serial No. 72,743

4 Claims. (Cl. 260—515)

This invention relates to a process for preparing 4,4'-nitrophenyl benzoic acid, and has for its object the improvement of the process for preparing 4,4'-nitrophenyl benzoic acid whereby it is obtained in a state of high purity and in good yields.

4,4'-nitrophenyl benzoic acid is a valuable intermediate for the synthesis of 4,4'-aminophenyl benzoic acid and the various dyes and other chemical compounds which require the use of it in their preparation.

The literature describes various methods for preparing 4,4'-nitrophenyl benzoic acid, but none of the described processes give sufficiently high yields of the product of the purity required in the manufacture of dyes or other chemicals to be useful from the commerical point of view. The nitration of 4-phenyl benzoic acid and the acetylation of nitrobiphenyl followed by oxidation of the acetyl group are described, and, while the 4,4'-acetylnitrobiphenyl can be oxidized to the 4,4'-nitrophenyl benzoic acid, the acetyl compound is obtained with difficulty by the prior art processes and the separation of the resulting isomers involves costly, inefficient solvent recrystallizations. Grieve and Hey (J. Chem. Soc. 1933, 968) acetylated nitrobiphenyl in carbon disulfide to obtain a yield of only 55% of a mixture of acetyl nitrobiphenyls which were then separated by solvent recrystallization and oxidized with potassium permanganate. Bernhauer, in J. Prakt. Chem. [2] 145, 301 (1936), describes the acetylation of nitrobiphenyl in nitrobenzene at 80° C., but by this process obtained a yield of only 11% after solvent recrystallization.

In the nitration of 4-phenyl benzoic acid as disclosed in the prior art, a mixture of the 4,4'- and 2,4' derivatives is obtained, but the separation of these two isomers, particularly in view of the resulting yield, makes this process unsuitable for economical commercial use.

I have now found that 4,4'-acetylnitrobiphenyl, which is substantially uncontaminated by the 2-acetyl isomer, can be obtained in high yields if the acetylation of 4-nitrobiphenyl is carried out in a medium containing a nitrobenzene-acetyl chloride-aluminum chloride complex at temperatures substantially below 80° C. I have further found that the resulting acetyl compound can be oxidized directly in the acetylation mass without isolation to give 4,4'-nitrophenyl benzoic acid in high yields.

The following examples are given to illustrate the invention. The parts used are by weight, unless otherwise specified.

Example 1

A mixture of 600 parts of dry nitrobenzene, 200 parts of anhydrous aluminum chloride, 200 parts of 4-nitrobiphenyl and 157 parts of acetyl chloride was slowly warmed with stirring to 50°–55° C. and held at that temperature for 18 hours. Evolution of hydrogen chloride was fairly rapid at first, but gradually decreased. The solution was cooled and drowned in ice water, washed acid free by successive decantations and the nitrobenzene removed by steam distillation. The total crude product which consists largely of 4,4'-acetylnitrobiphenyl was then subjected to oxidation with sodium hypochlorite prepared from 580 parts of sodium hydroxide, 428 parts of chlorine, 810 parts of water and 3340 parts of ice, according to the procedure of Organic Syntheses, Collective Vol. II, page 429. The mixture was slowly heated to 60°–70° C., at which temperature an exothermic reaction started.

When the heating and distillation of chloroform had largely subsided, the mixture was slowly heated to reflux (103° C.) and held at that temperature for 2 hours. 2500 parts of water were added at the boiling point of the mixture, the solution clarified to remove dirt and a small amount of unreacted nitrobiphenyl (total, 20 parts), and the clear filtrate cooled. After filtration of the white crystal mass, it was washed with dilute sodium chloride solution to remove the mother liquors, and then dried. There was obtained 204 parts (77% conversion or 85.6% yield, based on the nitrobiphenyl) of the sodium salt of 4,4'-nitrophenyl benzoic acid of excellent purity. Almost exactly the same yield was obtained when the acetyl chloride was added over a 5 hour period at 50°–55° C. and the mixture heated 4 more hours at that temperature. The crude nitrobiphenyl was 91% acetylated. The crude acetylnitro compound obtained melted at 147° C. In these examples, the unreacted nitrobiphenyl recovered was of high purity and suitable for further use.

Example 2

In a similar manner, a mixture of 15,650 parts of nitrobenzene, 5970 parts of nitrobiphenyl, 6420 parts of anhydrous aluminum chloride was heated to 50°–55° C. and acetyl chloride (3895 parts in a similar amount of nitrobenzene) was added over an 8 hour period with agitation. The mixture was then slowly heated to 60°–65° C., held 4 hours, cooled and drowned in cold water. After washing and steam distilling as described above, oxidation with sodium hypochlorite indicated that the yield of 4,4'-nitrophenyl benzoic acid was 87%.

Example 3

The reaction of acetyl chloride with nitrobiphenyl was carried out as described in Example 1. When the nitrobenzene layer had been washed acid free, it was poured directly into the sodium hypochlorite solution and oxidized in the same manner. When there was no hypochlorite left (as indicated with starch iodide paper) the aqueous layer was separated, combined with two successive hot water washings of the nitrobenzene layer, cooled to crystallize, and filtered. The yield of substantially pure sodium 4,4'-nitrophenyl benzoate was essentially the same as in Example 1. Acidification of the sodium salt yielded a very pure 4,4'-nitrophenyl benzoic acid melting at 340° C. Repeated recrystallizations of this product as the sodium salt gave a 4,4'-nitrophenyl benzoic acid of a melting point only 1° higher.

It will be seen from the above that we contemplate the use of a nitrobenzene-aluminum chloride-acetyl chloride complex in a temperature range where reaction is carried out through the complex and not through the individual dissociated molecules. The use of the complex apparently avoids undesirable side reactions and other complications, and also leads to the formation of a product consisting essentially of the desired 4-isomer. The complex should be one of an acetyl halide with aluminum chloride and a nitrobenzene. The acetyl halide is preferably the acetyl halide or a chloroacetyl halide. The preferred halides are the chlorides and the bromides. Acetic anhydride is also operable since it reacts with aluminum chloride to yield acetyl chloride. By a nitrobenzene, we mean nitro derivatives of aromatic hydrocarbons of the benzene series, nitrobenzene, the nitrotoluenes and xylenes, m-nitrochlorobenzene, etc. We prefer nitrobenzene and the nitrotoluenes since they are readily removed, as by steam distillation.

The solvent medium should contain a major proportion of the nitrobenzene, at least enough to form the stable soluble complex with the aluminum chloride. Since the acylation deals with biphenyls substituted in one ring with a negative group and therefore relatively inert toward further substitution, it is obviously not possible to employ any diluent which will readily acylate such as benzene and toluene. Di- and trichlorobenzenes are particularly suitable as auxiliary solvents in which to carry out the reaction.

The reaction of the present invention is preferably carried out by employing at least one mol of each of the acetyl chloride and aluminum chloride per mol of nitrobiphenyl in at least one mol of nitrobenzene. Ordinarily, the reaction will be carried out in two or more mols of nitrobenzene. It is desirable that the complexes formed are those with at least 2 of the nitro compound per aluminum chloride and the nitrobiphenyl itself may, of course, function as one.

The reaction is preferably carried out at temperatures between 40° and 70° C. 4-Nitrobiphenyl normally will start to react at a good rate at about 50°–55° C. Temperatures of 80° C. and higher appear to bring about undesirable side reactions and materially reduce the yield of the desired 4,4'-nitrophenyl benzoic acid.

While various oxidizing agents have been disclosed for converting the 4,4'-acetylnitrobiphenyl to the 4,4'-nitrophenyl benzoic acid, I have found that by the present process, where sodium hypochlorite is added directly to the crude acetylation mass after substantial removal of the aluminum chloride, a conversion of the acetyl product to the 4,4'-nitrophenyl benzoic acid is obtained which cannot be obtained by the use of other oxidizing agents. Although the acetylnitrobiphenyl may be isolated from the acetylation mass prior to oxidation, I have found that greatly improved yields are obtained when the sodium hypochlorite oxidation is carried out on the crude, unisolated acetyl product. For this purpose the condensation is drowned in water to decompose the aluminum chloride. The nitrobenzene solution of the crude acetyl product may then be oxidized directly, or, if desired, part or all of the solvent may be removed by suitable distillation, e. g., preferably under vacuum or with steam. When treated with the alkaline hypochlorite, oxidation may start as low as 50° C. when the acetyl product is in nitrobenzene. If the nitrobenzee has been removed, the first reaction normally occurs at 60°–70° C. When the initial exothermic reaction has subsided, the reaction mixture is heated to its boiling point to oxidize the last traces of acetyl nitrobiphenyl and to consume undesirable colored materials which may have been present in the nitrobiphenyl or formed during the various reactions.

This oxidation gives a substantially theoretical conversion of the 4,4'-acetylnitrobiphenyl to the 4,4'-nitrophenyl benzoic acid which, in turn, is readily separated from the unreacted nitrobiphenyl and isolated in a pure condition. I have also found that improved yields of the nitrophenyl benzoic acid of relatively high purity can be obtained where the acetylation is carried out in nitrobenzene at the higher temperatures described in the prior art, provided the oxidation of the acetyl compound to the nitrophenyl benzoic acid is effected by the use of an aqueous alkaline hypochlorite directly in the nitrobenzene reaction mass after substantial removal of the aluminum chloride. This method of oxidation not only increases the yield of the desired nitrophenyl benzoic acid, but greatly facilitates its isolation in a relatively pure form.

I claim:

1. A process for preparing 4,4'-nitrophenyl benzoic acid which comprises effecting the acetylation of 4-nitrobiphenyl in a nitrobenzene with an acetyl halide and in the presence of aluminum chloride at temperatures of from 40° to 70° C., removing the aluminum chloride from the reaction mass and oxidizing the resulting crude 4,4'-acetylnitrobiphenyl in the presence of at least part of the nitrobenzene in which it has been formed and from which it has not been separated, with an aqueous solution of an alkaline hydochlorite, and isolating the resulting 4,4'-nitrophenyl benzoic acid.

2. A process for preparing 4,4'-nitrophenyl benzoic acid which comprises acetylating 4-nitrobiphenyl in nitrobenzene with acetyl chloride and in the presence of aluminum chloride at temperatures of from 40° to 70° C., removing the aluminum chloride from the reaction mass, adding an aqueous sodium hypochlorite solution directly to the remaining nitrobenzene solution, heating the mass at a temperature of from 50° to the boiling point of the solution to effect oxidation of the resulting 4,4'-acetylnitrobiphenyl to the 4,4'-nitrophenyl benzoic acid, and isolating the 4,4'-nitrophenyl benzoic acid.

3. A process for preparing 4,4'-nitrophenyl benzoic acid which comprises acetylating 4-nitrobiphenyl in nitrobenzene with acetyl chloride and in the presence of aluminum chloride at temperatures of from 40° to 70° C., removing the aluminum chloride, containing at least part of the nitrobenzene in which the acetylation was carried out, with sodium hypochlorite at a temperature of from 60° C. to the boiling point of the solution to effect oxidation of the resulting 4,4'-acetylnitrobiphenyl to the 4,4'-nitrophenyl benzoic acid, and isolating the 4,4'-nitrophenyl benzoic acid.

4. In the process of preparing 4,4'-nitrophenyl benzoic acid in which 4-nitrobiphenyl is acetylated in a nitrobenzene in the presence of aluminum chloride, the step which comprises subjecting the crude mixture of the acetylation product to oxidation with an aqueous alkaline hypochlorite in the presence of at least part of the nitrobenzene employed in the acetylation step.

HERMAN E. SCHROEDER.

REFERENCES CITED

The following references are of record in the file of this patent:

UNITED STATES PATENTS

| Number | Name | Date |
|---|---|---|
| 2,054,107 | Wahlforss et al. | Sept. 15, 1936 |

FOREIGN PATENTS

| Number | Country | Date |
|---|---|---|
| 390,556 | Great Britain | Apr. 13, 1933 |

OTHER REFERENCES

Grieve et al., J. Chem. Soc. (London), vol. 1933, pp. 968–972.

Bernhauer et al., J. Prakt. Chemie, vol. 145, pp. 306–307 (1936).

Certificate of Correction

Patent No. 2,567,126 September 4, 1951

HERMAN E. SCHROEDER

It is hereby certified that error appears in the printed specification of the above numbered patent requiring correction as follows:

Column 4, line 11, for "nitrobenzee" read *nitrobenzene*; line 50, for "hydochlorite" read *hypochlorite*; line 70, after "chloride" strike out the comma and insert *from the reaction mass, heating the resulting aqueous mass*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*